United States Patent
Hofbeck et al.

(10) Patent No.: US 7,315,002 B2
(45) Date of Patent: Jan. 1, 2008

(54) DEVICES AND METHOD FOR DETECTING THE POSITION AND THE WEIGHT OF A PERSON

(75) Inventors: Klaus Hofbeck, Neumarkt (DE); Thomas Klement, Regensburg (DE); Birgit Rösel, Regensburg (DE); Arnd Stielow, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 256 days.

(21) Appl. No.: 10/938,207

(22) Filed: Sep. 10, 2004

(65) Prior Publication Data

US 2005/0056467 A1 Mar. 17, 2005

Related U.S. Application Data

(60) Provisional application No. 60/544,887, filed on Feb. 14, 2004.

(30) Foreign Application Priority Data

Sep. 15, 2003 (DE) ................. 103 42 554

(51) Int. Cl.
*G01G 19/08* (2006.01)
*G08B 21/00* (2006.01)

(52) U.S. Cl. ...................... 177/136; 340/667

(58) Field of Classification Search ............... 177/144, 177/136, 154–157; 280/735; 340/667
See application file for complete search history.

(56) References Cited

U.S. PATENT DOCUMENTS

| | | | |
|---|---|---|---|
| 4,969,112 A * | 11/1990 | Castle | 702/173 |
| 6,282,473 B1 | 8/2001 | Steffens, Jr. | |
| 6,302,438 B1 * | 10/2001 | Stopper et al. | 280/735 |
| 6,323,443 B1 | 11/2001 | Aoki et al. | |
| 6,462,701 B1 | 10/2002 | Finn | |
| 6,555,766 B2 | 4/2003 | Breed et al. | |
| 6,633,008 B2 * | 10/2003 | Johnson | 177/184 |
| 6,820,897 B2 * | 11/2004 | Breed et al. | 280/735 |
| 6,868,734 B2 | 3/2005 | Jakoby et al. | |
| 2001/0025730 A1 * | 10/2001 | Cook et al. | 177/25.13 |
| 2003/0023362 A1 | 1/2003 | Breed et al. | |

(Continued)

FOREIGN PATENT DOCUMENTS

DE 199 25 877 A1 1/2000

(Continued)

*Primary Examiner*—Vit Miska
*Assistant Examiner*—Sean Kayes
(74) *Attorney, Agent, or Firm*—Laurence A. Greenberg; Werner H. Stemer; Ralph E. Locher

(57) ABSTRACT

The position and the weight of a person, in particular a person on a motor vehicle seat, is determined. Reflectors are used to reflect electromagnetic radiation from a transceiver. The attenuation of the sensor reflector radiation enables a report on the seat position of a person in the radiation path. An antenna of each sensor reflector is connected to an electrical load assigned thereto, which is dependent on the weight of the person acting upon it. Depending on this weight, weight information about the person is superimposed by the load onto the reflected sensor reflector signal. The reflected sensor reflector signal is received by the transceiver and fed to the evaluation unit after a signal pre-processing, which enables the weight information of the person to be evaluated.

12 Claims, 5 Drawing Sheets

U.S. PATENT DOCUMENTS

2003/0085060 A1 * 5/2003 Becker et al. .............. 177/144

FOREIGN PATENT DOCUMENTS

| DE | 199 57 557 A1 | 6/2001 |
| DE | 101 44 877 A1 | 4/2003 |
| DE | 101 60 121 A1 | 6/2003 |
| DE | 102 54 197 A1 | 6/2004 |
| WO | WO 01/94157 A1 | 12/2001 |
| WO | 2004/045917 A1 | 6/2004 |

* cited by examiner

DEVICES AND METHOD FOR DETECTING THE POSITION AND THE WEIGHT OF A PERSON

CROSS-REFERENCE TO RELATED APPLICATION

This application claims the benefit under, 35 U.S.C. § 119(e), of copending provisional application No. 60/544,887, filed Feb. 14, 2004; this application also claims the priority, under 35 U.S.C. § 119, of German patent application No. 103 42 554.3, filed Sep. 15, 2003; the prior applications are herewith incorporated by reference in their entirety.

BACKGROUND OF THE INVENTION

Field of the Invention

The invention relates to devices and a method for detecting the position and the weight of a person, in particular the person on a vehicle seat. Reflectors are used to reflect electromagnetic radiation from a transceiver, wherein a characteristic attenuation of the radiation received by the transceiver allows conclusions to be drawn about the person located in the radiation path between the transceiver and the reflector.

In the area of occupant protection systems for motor vehicles, more importance has been attributed over the last few years, in the developing field of the occupant restraining systems, to adapting the trigger of the occupant restraining system, for example front airbags, side airbags, knee airbags and curtain air bags etc. to the vehicle occupant. This is done, on the one hand, to save on repair costs and to prevent an occupant restraining means from triggering from the outset, in the case of an unoccupied seat, and on the other hand to prevent endangering specific occupant groups due to an unsuitable trigger behavior of the occupant restraining means, for example, with children or very small adults. As a result, it is not only important to determine the presence of a person on the vehicle seat, but furthermore to determine the exact position and even the person's classificatory characteristics such as body weight for example. The Crash-Norm FMVSS 208 is worth noting in this context, its compliance still being required by motor vehicle manufacturers and which determines the classification of a person according to his/her weight, so as to adjust the control of an occupant restraining system in a suitable manner, in the event of a collision, to the person detected.

Our commonly assigned, prior German Patent Application DE 102 54 197 and its corresponding PCT publication WO 2004/045917 A1 describe the use of generic microwave reflectors to determine the presence and the position of a person on a vehicle seat. In addition, one or plurality of reflectors is arranged on a vehicle seat. The reflectors reflect the signals received by the transceiver. A control unit connected to the transceiver analyses the reflected signals received, on the basis of the signal amplitude and/or the signal delay and/or the coding of the signals, for example by means of modulating the signals reflected by the reflector, thereby obtaining the information as to whether a seat is occupied by a person or another object. Furthermore, the exact position of a person on a seat can be detected.

Other devices are still required in order to measure the weight or the weight distribution of a person on a vehicle seat, as specified for example by the Crash-Norm FMVSS 209. By way of example, the commonly assigned German published patent application DE 101 60 121 A1 discloses a sensor seat mat for detecting the occupation of a seat in a motor vehicle, wherein there is a planar arrangement of a plurality of pressure sensitive sensor elements (A, S) on the seat surface of a vehicle seat, each changing their resistance value depending on the weight acting thereon. U.S. Pat. No. 6,323,443 and German published patent application DE 199 25 877 A1 further discloses the method whereby the weight of a vehicle occupant is recorded by means of load sensors arranged between the vehicle seat and the vehicle floor. The sensors used for this example can use capacitive measurement principles (cf. col. 7, line 30).

SUMMARY OF THE INVENTION

It is accordingly an object of the invention to provide a method and system for determining a position and a weight of a person which overcomes the above-mentioned disadvantages of the heretofore-known devices and methods of this general type and wherein a known reflector for detecting the seat position of a vehicle occupant is designed in such a way that it can record weight information from the weight force acting thereon and transfer it together with the reflected signal to the transceiver and on the other hand, this weight information can be analyzed on the receiver side.

With the foregoing and other objects in view there is provided, in accordance with the invention, a device for detecting the position and the weight of a person, comprising:

at least one transceiver for electromagnetic signals;

a weight-dependent changeable electrical load device disposed to detect weight information about the person;

at least one sensor reflector with an antenna for reflecting a transmitting signal from the transceiver as a sensor reflector signal, the antenna of the sensor reflector being linked to the electrical load device and the sensor reflector signal including weight information about the person, superimposed by the load device;

an evaluation unit connected to the transceiver and being configured to evaluate the weight information of the person.

With the above and other objects in view there is also provided, in accordance with the invention, a sensor reflector for detecting a weight of a person, comprising:

an antenna configured to reflect a transmitting signal of a transceiver as a sensor reflector signal;

an electrical load device connected to the antenna, the load device having a weight-dependent changeable load value; and the sensor reflector signal containing weight information about the person superimposed by the load device.

With the above and other objects in view there is also provided, in accordance with the invention, a method for detecting a position and a weight of a person, which comprises:

transmitting a transmitting signal with the transceiver;

receiving the transmitting signal with the sensor reflector;

superimposing weight information of a person on the receiving signal with the sensor reflector, and reflecting the signal with the superimposed weight information as a sensor reflector signal;

receiving the sensor reflector signal with the transceiver; and determining the weight information of the person from the sensor reflector signal received by the transceiver.

The present invention mainly discusses the use of the inventive device and the inventive method for detecting the position and the weight of a person on a vehicle seat within a motor vehicle, nevertheless the disclosed device and method can also be applied effectively in other areas.

The device according to the invention for detecting the position and the weight of at least one person comprises at least one transceiver for electromagnetic signals, at least one sensor reflector according to the invention with an antenna to reflect a transmitting signal from the transceiver as a sensor reflector signal and furthermore an evaluation unit which is linked to the transceiver. In accordance with the invention the antenna of each sensor reflector is linked to a respective electrical load assigned thereto, which is dependent on the weight of the person acting thereon. Depending on this weight, information about the person's weight is superimposed by the load onto the reflected sensor reflector signal. The reflected sensor-reflector signal is received by the transceiver and is fed, where necessary, into the evaluation unit after a signal pre-processing. This enables an evaluation of the person's weight information, preferably in addition to the evaluation specified in the introduction of the above-noted commonly assigned German patent application DE 102 54 197 and WO 2004/045917 A1—which are herewith incorporated by reference.

In a first preferred embodiment, the load is changed depending on the weight by means of an oscillator. The oscillator oscillates with an oscillation frequency, which is changeable depending on the weight imposed on the oscillator.

A weight-dependent change in the load of the sensor reflector by means of the oscillator is achieved using an advantageous embodiment of the invention, the load comprising a switch whose first connection is linked to the antenna of the sensor reflector and whose control connection is linked to the signal output of the oscillator. The second connection of the switch is linked to a reference potential, preferably linked via an electrical resistance to the ground connection of the sensor reflector.

An oscillator comprising at least one component which influences its oscillation frequency, with a characteristic value dependent on the weight imposed by a person on the element is particularly simple and thus especially advantageous. This can typically be a capacitor, whose capacitor plate distance changes under the influence of a weight, whereby its characteristic capacity value also changes. In the event that the capacitor is located at a suitable position within an oscillator switch, for example a Colpitts switch or a Hartley switch or similar, the oscillator frequency changes at the signal output of the oscillator. As the signal output of the oscillator is linked to the control connection of the switch, the load prevailing from the switch itself and the resistance directed to the ground is changed periodically by means of the weight-dependent frequency of the oscillator. In this way, the amplitude of the sensor reflector radiation reflected by means of the sensor reflector changes according to the weight imposed on the capacitor, which can be interpreted by the evaluating unit as weight information.

The use of another switch element in a suitable oscillator, in place of a weight-dependent capacitor, is also possible, comprising a characteristic weight-dependent value, for example a quartz oscillator which compresses when a force is acting on it and thus its oscillation behavior changes, or a coil whose inductance changes depending on the weight acting on it, whereby for example a coil core is moved into or removed from the coil winding, depending on the weight, or whereby the coil winding is designed as a spring and its inductance is increased or similar as a result of compression by means of a coil winding.

Naturally a sensor reflector is also conceivable, wherein a plurality of elements within the oscillator change a characteristic value depending on the weight.

A second preferred embodiment for a device according to the invention features an oscillator circuit as a load, whose resonance frequency is weight-dependent. In this embodiment a maximum amplitude of the reflected sensor reflector signals is only achieved with the resonance frequency of the oscillator circuit. The second form of embodiment for a device according to the invention is particularly advantageous if the transmitting signals from transceiver are wideband. This means that the frequency of the transmitting signal within a relatively large frequency band varies during transmission. The transmission carrier frequencies typically lie above 100 MHz. Typically 315 MHz (US), 433 MHz (EP), 868 MHz (EP), 915 MHz (US), or 2.45 GHz are used.

Similar to the first advantageous embodiment of the inventive device, the oscillation circuit used comprises a component influencing the resonance frequency with a characteristic weight-dependent value, for example in the form of the previously mentioned weight-dependent capacitor, the weight-dependent coil or weight-dependent quartz oscillator.

A particularly simple oscillation circuit is a series or parallel oscillation circuit with at least one capacitor and one coil, wherein preferably at least one of these two elements features a weight-dependent value.

In most cases within a device for detecting the position and the weight of a person, in particular the person on a vehicle seat in a motor vehicle, not one but a plurality of sensor reflectors are arranged on the seat surface of the vehicle seat. In this manner, it is not only the seat position of a person which can be determined accurately on the basis of the signal amplitude of the reflected sensor reflector signal but also the weight. In the case that a large number of weight sensitive sensor reflectors are available on the surface of the vehicle seat, a classification of the person located on the motor vehicle seat can be undertaken on the basis of the distribution of the weight imposed on the vehicle seat.

The use of a plurality of sensor reflectors according to the first advantageous embodiment with a weight-dependent oscillating oscillator is thus advantageous with regards to facilitating an arrangement of the individual sensor reflectors to the signals received. For example, an individual coding of each individual sensor reflector can be achieved by connecting a matching network and if necessary a surface wave acoustic device to the antenna of each sensor reflector, by means of which an individual code can be superimposed on each sensor reflector signal by means of modulation, for example code transmitters of motor vehicle access systems, according to the commonly assigned German patent application DE 199 57 557 A1.

The use of a plurality of sensor reflectors according to the second advantageous embodiment of the novel device according to the invention, wherein the weight-dependent changeable load is configured by means of an oscillation circuit, can be reserved for the sensor reflector signal of different sensor reflectors of each different frequency bands. Within these individual frequency bands, the maximum amplitude of the respective sensor reflector signal varies depending on the weight.

In both embodiments of the device according to the invention the sensor reflectors are preferably not only arranged on the seat surface of the vehicle seat, but for example, also on the surface of the vehicle seat rest and/or on the headrest of the vehicle seat. This arrangement is similar to the known arrangement of reflectors for detecting the seat position as disclosed in the unpublished Patent Application DE 10254197.3, nevertheless additional information can also be acquired regarding the force imposed on the headrest. For example, information can be acquired as to whether a person is resting his head on the headrest of the motor vehicle seat.

Other features which are considered as characteristic for the invention are set forth in the appended claims.

Although the invention is illustrated and described herein as embodied in a devices and method for detecting the position and the weight of a person, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
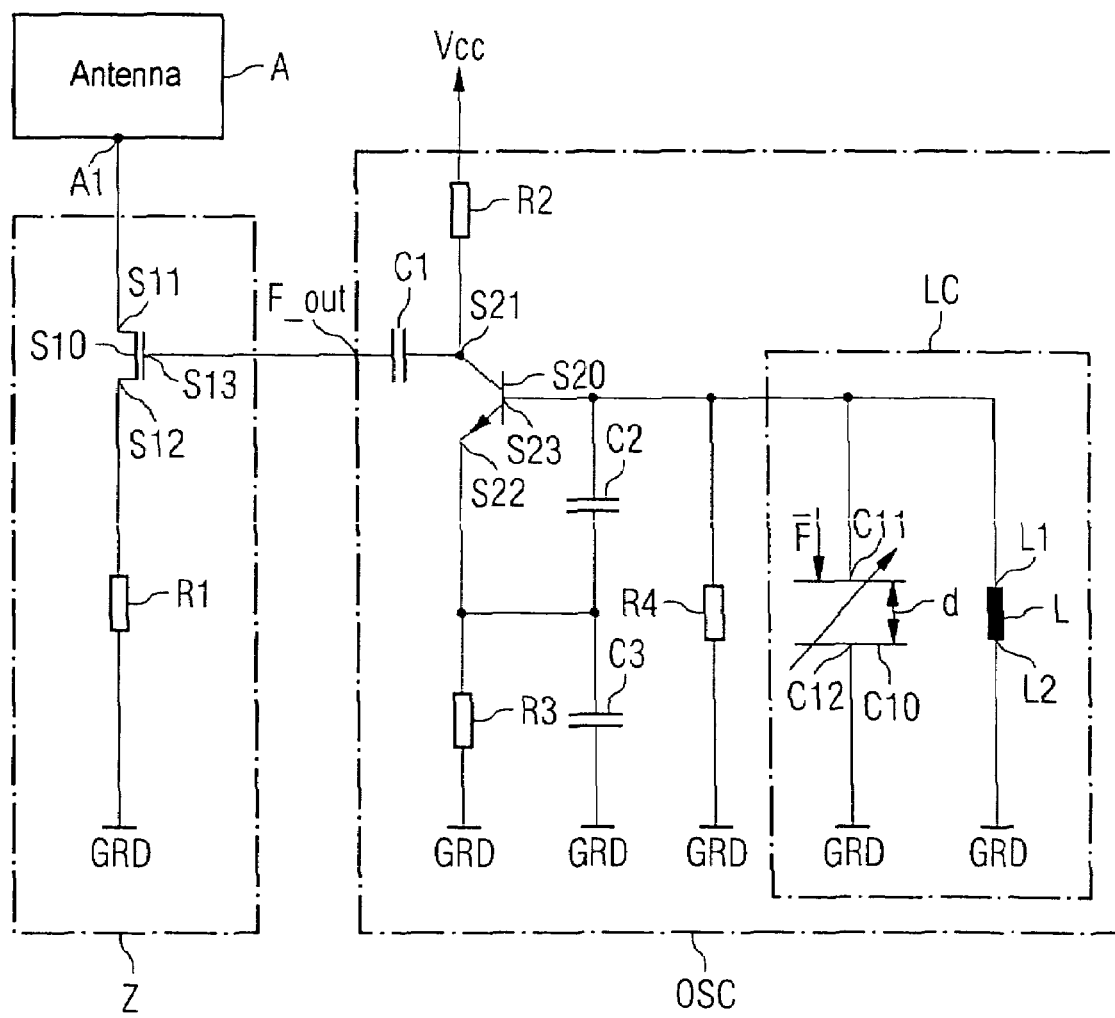
FIG. 1 is a circuit diagram of a sensor reflector of a device according to a first advantageous embodiment of the invention.

Referring now to the figures of the drawing in detail and first, particularly, to FIG. 1 thereof, there is shown a sensor reflector 6 of a device according to the invention according to a first preferred embodiment. The sensor reflector ≠ shown comprises an antenna A, a load Z and an oscillator OSC. The antenna A is for example a copper plate with edge lengths of 3 and 4 cm. A connection A1 of the antenna A is linked to the drain terminal S11 of a MOSFET transistor S10, the Source S12 thereof being linked by means of a load resistance R1 to the ground connection GRD. The MOSFET transistor S10 and the load resistance R1 combine to form the weight-dependent changeable load Z, once the gate connection S13 of the transistor S10 is controlled depending on the weight. This is effected by means of the signal output of a Colpitts oscillator OSC, whose signal output F_OUT is connected to the gate connection S13 of the transistor S10. The represented Colpitts oscillator OSC comprises a npn bipolar transistor S20, whose commutator connection S21 is linked by means of a resistance R2 to a supply voltage Vcc and furthermore by means of a decoupling capacitor C1 to a signal output F_OUT of the oscillator. The emitter S22 is linked by means of a resistance R3 and also a capacitor C3 to the ground connection GRD. In addition, the emitter is linked to its basic access S23 by means of a further capacitor C2. The basic access S23 of the transistor S20 is linked to the ground connection GRD, by means of a load resistance R4 and by means of a parallel oscillation circuit comprising a weight-sensitive capacitor C10 and a coil L.

The diagram also shows a weight $\overline{F}$ in the direction indicated by the arrow which acts upon the first electrode C11 of the capacitor C10. The electrode gap of the capacitor C10 changes depending on this force acting thereon. In this way, the capacity value C of the capacitor C10 changes, since this is indirectly proportional to the distance between capacitor electrodes C11 and C12, according to the formula:

$$C \approx \frac{1}{d} \quad [1]$$

The capacitor C10 is a frequency-determined element for the oscillation frequency f of the Colpitts oscillator OSC with which the output signal oscillates at its signal output F_OUT. If the value of the capacity C of the capacitor C10 changes subsequently according to the formula [1] due to a weight $\overline{F}$ acting thereon, the oscillation frequency of the control voltage changes at the gate connection S13 of the MOSFET transistor S10 depending on the weight. A sensor reflector signal T reflected by the antenna A is attenuated on the basis of a weight-dependent oscillation load Z. The transceiver 9 receives this weight-dependent oscillating attenuated sensor reflector R, prepares it by means of suitable demodulation processes and forwards it to the evaluation unit 12, which analyses the weight information received in the receiving sensor reflector signal R and if necessary can adjust the trigger behavior of an occupant protection system to the determined weight or the determined weight distribution of a person 10 on the motor vehicle seat 2.

Figure 2:
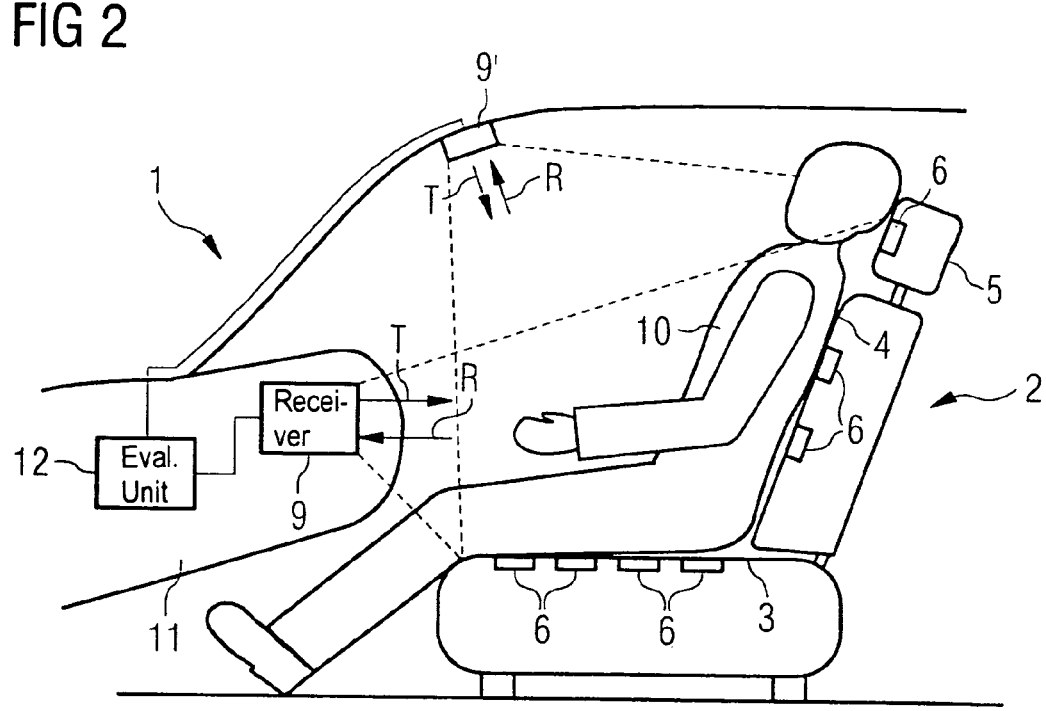
FIG. 2 is a schematic representation of an inventive device for detecting the position and the weight (F) of a person on a vehicle seat within a motor vehicle.

FIG. 2 shows an exemplary embodiment for an inventive device in a motor vehicle 1. A plurality of sensor reflectors 6 are strategically distributed on a motor vehicle seat, i.e., they are disposed on the seat surface 3, on the surface of the backrest 4, and in the head rest 5 of a motor vehicle seat. A transceiver 9 is mounted to the motor vehicle dashboard 11 of the motor vehicle 1. The mounting location for a suitable transceiver 9 can also be found elsewhere in the motor vehicle, for example in the area of the rear-view mirror, which is indicated by the additional transceiver 9' shown in FIG. 2, which was however, not a prerequisite in the present exemplary embodiment.

Furthermore, a person 10 is represented who is positioned on the motor vehicle seat 2 resting against the seat rest 4. An evaluation unit 12 is linked to the transceiver 9.

The transceiver 9 receives the sensor reflector signal R and demodulates it for example with the help of the known FM-CW radar method (frequency modulated continues wave) or another suitable method. Thus the transceiver receives a mostly low frequency measurement signal, by means of which the presence, position and weight of the person (10) can be evaluated. The evaluation is effected in an evaluation unit 12, which is for example, an element of the occupant protection system, preferably designed by means of a controller in the control unit of the occupant protection system or is arranged as a computing unit within the transceiver 9, or at least linked thereto, and can transfer the information determined for passenger 10 to the occupant protection system, wherein the trigger of an occupant restraining means is adjusted where necessary.

A corresponding arrangement of the sensor reflector signals R to the sensor reflectors assigned thereto can be achieved for example by means of an individual coding of the sensor reflector signals R of each sensor reflector, as mentioned in the introduction.

Figure 3:
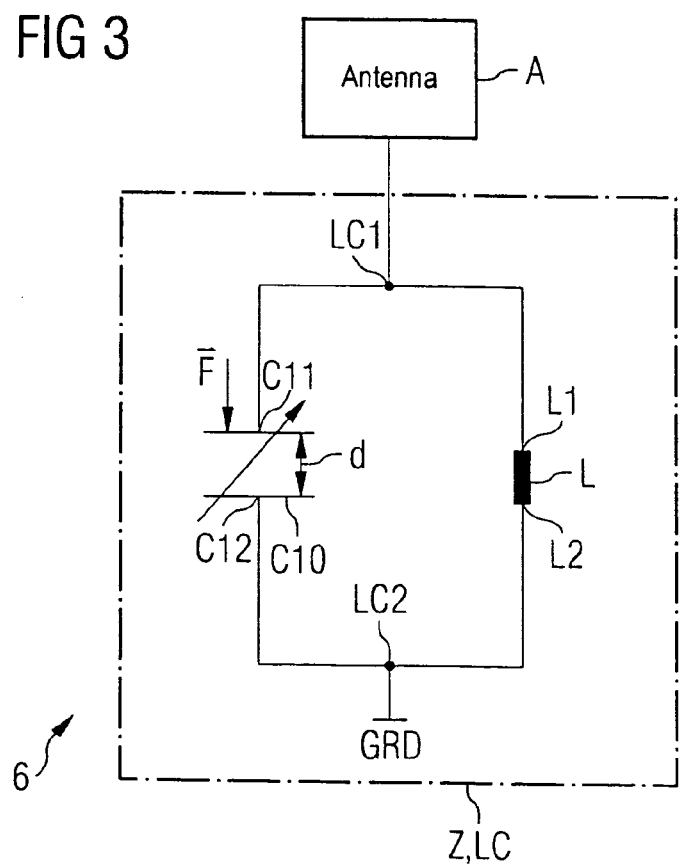
FIG. 3 shows a circuit diagram of an inventive sensor reflector of an inventive device according to a second advantageous embodiment of the invention.

FIG. 3 shows a schematic representation of an exemplary embodiment for a sensor reflector 6 according to a second preferred embodiment of the inventive device. Said device comprising an antenna A, which is linked at one end to a first electrode C11 of a capacitor C10 and a first connection L1 of a coil L, and which combine to form a parallel oscillation circuit. The second electrode C12 of the capacitor C10 and a second connection L2 of the coil L are linked together with the common ground connection GRD.

Dependent on the resonance quality of the parallel oscillation circuit LC, the more attenuated the oscillations, the further their oscillation frequency fluctuates from the resonance frequency $f_{res}$ of the parallel oscillation circuit LC. A maximum amplitude of the signal T received by the antenna A and the sensor reflector signal reflected by the antenna A occurs during the resonance frequency $f_{res}$ of the parallel oscillation circuit LC.

The resonance frequency $f_{res}$ of the parallel oscillation circuit LC represented can be described by means of the formula:

$$f_{res} = \frac{1}{2\Pi} \cdot \sqrt{\frac{1}{LC}} \quad [2]$$

wherein L is the inductance of the coil L and C is the capacity of the capacitor C10.

Since within the scope of known reflectors for occupant detection the conventionally used carrier frequencies f lie in a frequency band of approximately 80 Megahertz to 2,45 Gigahertz for example, the weight-dependent resonance frequency $f_{res}$ of the parallel oscillation circuit LC can preferably be varied within this carrier frequency band. If a plurality of sensor reflectors 6 is used, it is advantageous for the arrangement of the sensor reflector signals R received by the transceiver 9 to the individual sensor reflector 6, if the resonance frequency $f_{res}$ assigned to each sensor reflector 6 can only be varied weight-dependent in different, narrow-band resonance frequency bands, wherein all resonance frequency bands of the sensor reflector 6 lie within the carrier frequency band transmitted by the transceiver 9.

The transceiver 9 transmits wideband transmitting signals T, ranging for example from a lowest frequency f=2.45 Gigahertz−40 Megahertz to an uppermost frequency f=2.45 Gigahertz+40 Megahertz. Each sensor reflector 6 reflects the radiation received with a maximum amplitude in a specific frequency band for the respective sensor reflector 6 around its current resonance frequency $f_{res}$. If the sensor reflector (6) is loaded with a weight F, its resonance frequency $f_{res}$ reduces according to the above-mentioned formulae [1] and [2].

The sensor reflector signals R of all sensor reflectors can also reflect all weight-dependent variants within the same frequency band. A corresponding arrangement of the sensor reflector signals R can be achieved for example by means of an individual coding of the sensor reflector signals R or each sensor reflector.

Figure 4A:
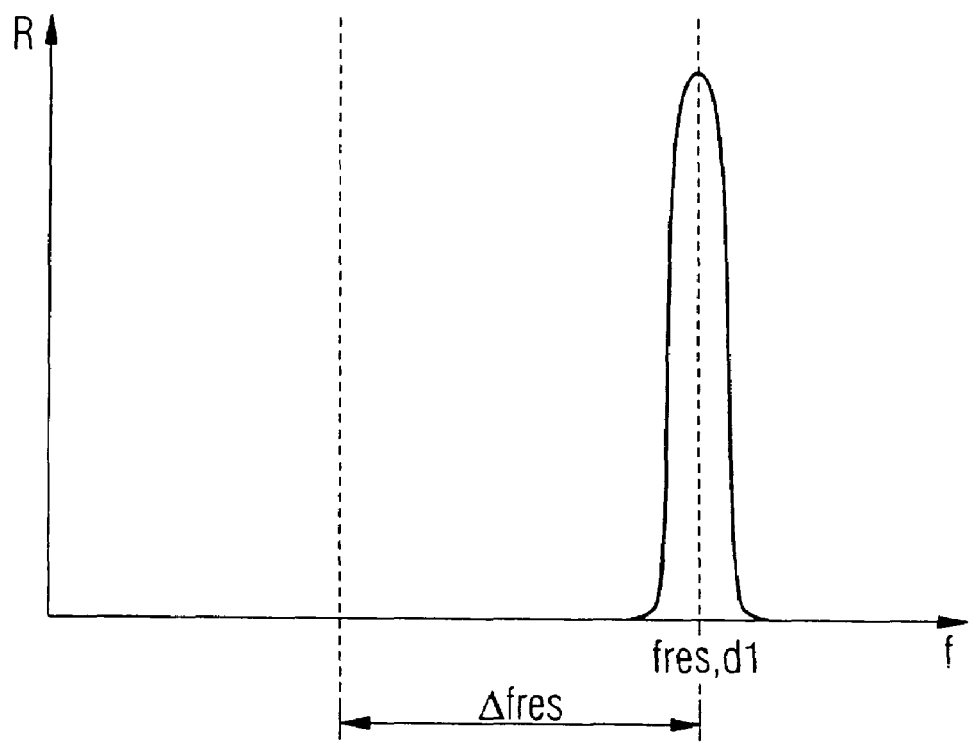
FIG. 4A is a schematic representation of the sensor reflector signal of a sensor reflector according to FIG. 3, applied by means of the carrier frequency, for an unloaded sensor reflector.
Figure 4B:
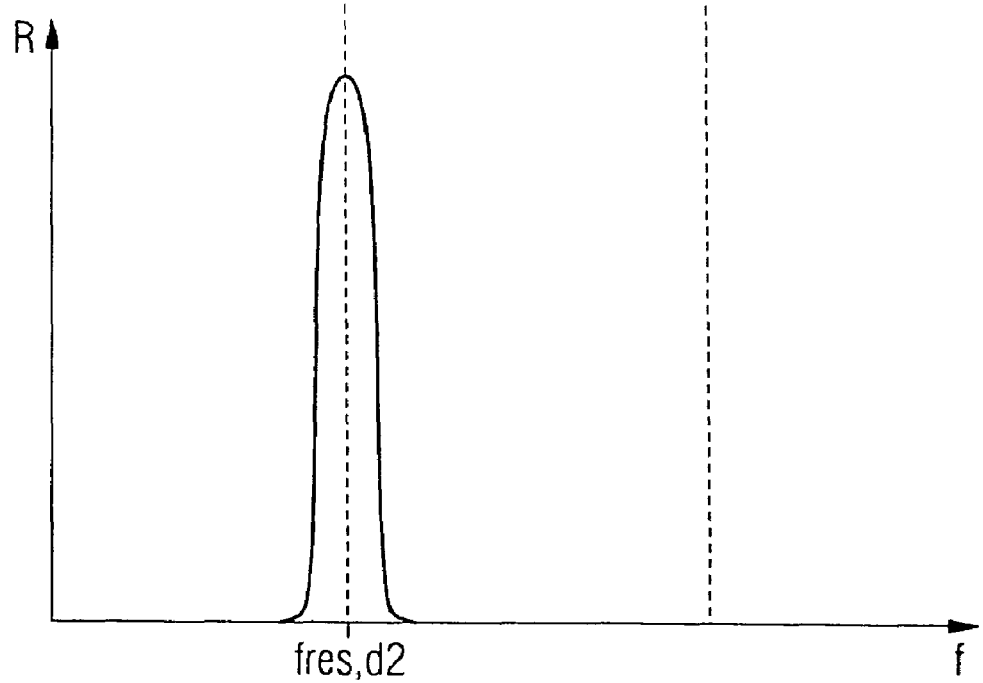
FIG. 4B is a schematic representation of the sensor reflector signal of a sensor reflector according to FIG. 3, applied by means of the carrier frequency for a weight-loaded sensor reflector.

FIGS. 4A and 4B show a schematic representation of typical sensor reflector signals R of the preferred second embodiment of the invention in FIG. 3, applied by means of the carrier frequency f for 4A) an unloaded sensor-reflector 6 and for 4B) a weight-loaded sensor reflector 6. FIG. 4A shows a resonance peak of the sensor reflector signal R with a maximum resonance frequency $f_{res,d1}$ and a capacitor electrode gap d1 (FIG. 6). FIG. 4B shows the resonance peak around a resonance frequency $f_{res,d2}$. This resonance frequency $f_{res}$ ceases when a force F approaches the first capacitor electrode C11 up to a distance d2 at the second capacitor electrode C12. By reducing the electrode distance d, the resonance frequency $f_{res}$ of the parallel oscillation circuit displaces about a frequency difference$\Delta_{fres}$. This value represents a measure for the weight F acting on the respective sensor reflector 6 and thus reproduces weight information with regards to the person 10 seated on the vehicle seat. A maximum frequency displacement$\Delta_{fres}$ of several 10 KHz results by means of the overall weight measurement range.

The evaluation unit 12 can determine the frequency position of the maximum amplitude of the sensor reflector signal R at a resonance frequency $f_{res}$ and evaluates its weight information by means of a frequency displacement $\Delta_{fres}$ caused by a weight.

Figure 5:
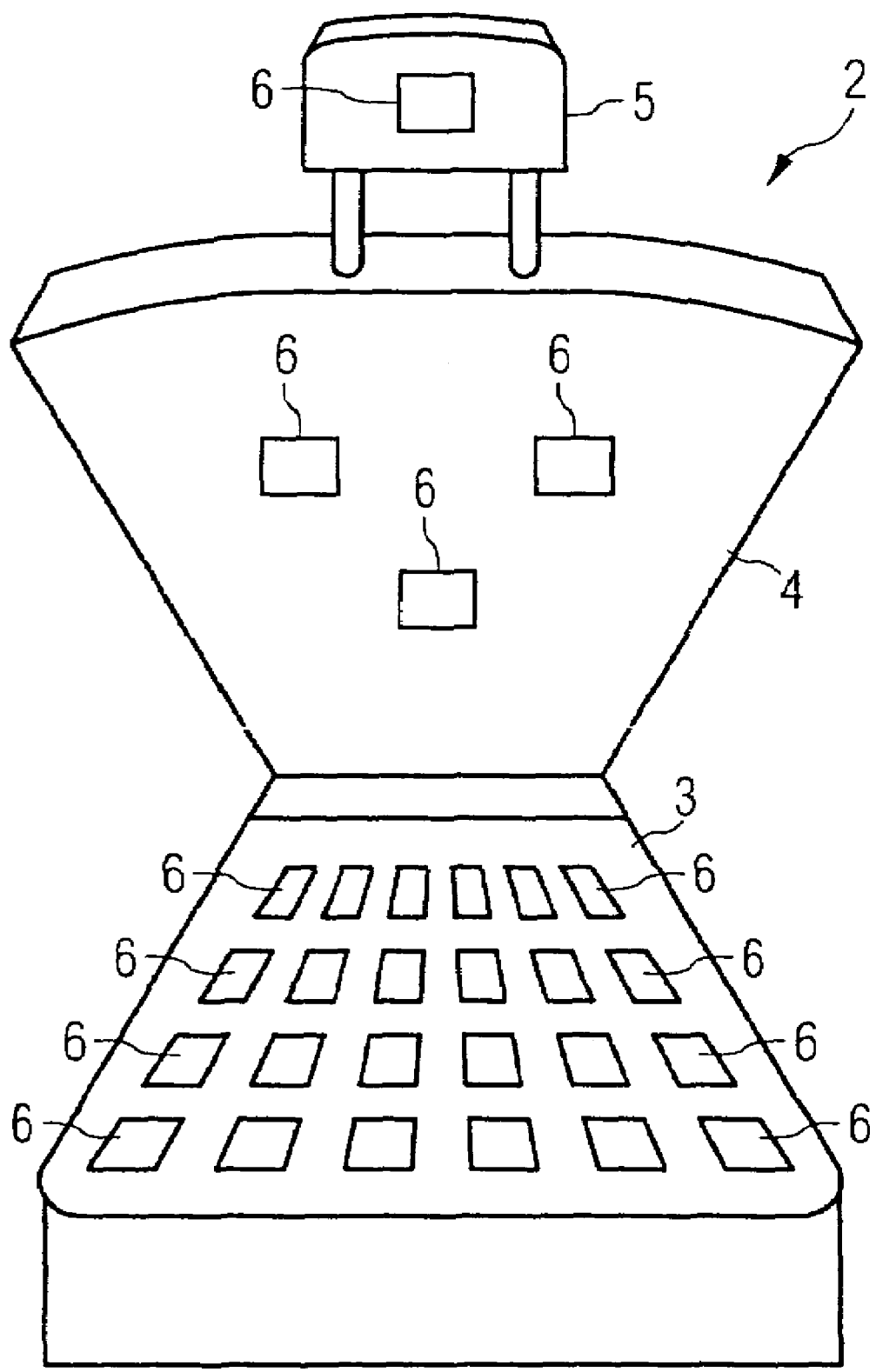
FIG. 5 is a diagrammatic view of a vehicle seat illustrating a variety of different possible mounting locations of a sensor reflector according to the invention.

FIG. 5 shows a motor vehicle seat 2 with a motor vehicle seat rest 4, a head support 5 and a motor vehicle seat surface 2. Preferred mounting locations of inventive sensor reflectors 6 are marked on the motor vehicle seat 2. To record the weight of a motor vehicle occupant 10 and thus his/her weight distribution on a motor vehicle seat as accurately as possible, it is advantageous to arrange as many sensor reflectors 6 as possible on the motor vehicle seat surface 3. Furthermore, in order to acquire even more precise information regarding the seating position, the mounting of sensor reflectors 6 also on the motor vehicle seat rest 4 and the head support 5 is advantageous. It can thus be determined whether a motor vehicle occupant 10 is resting against the motor vehicle seat rest 4 or whether his head presses against the head support.

A weight-sensitive capacitor C10 suitable for both the first embodiment of the inventive device in accordance with FIG. 1 and for the second embodiment according to FIG. 3 is for example, a freely etched cavity in a micro mechanical semi-conductor chip, wherein the capacitor plates are maintained at a distance from each other by means of the semi-conductor material of the chip. It is also possible to establish a suitable capacitor C10 from elastomer films arranged in parallel, or similar. The two capacitor plates C11 and C12 are arranged particularly in parallel to the largest surface attenuation of the sensor reflector 6 and parallel to a force recording surface of the vehicle seat 2, for example, parallel to the seat surface 3. Further electronics can be arranged advantageously on the chip during a micro mechanical implementation of the capacitor C10 on a semi-conductor chip.

Figure 6A:
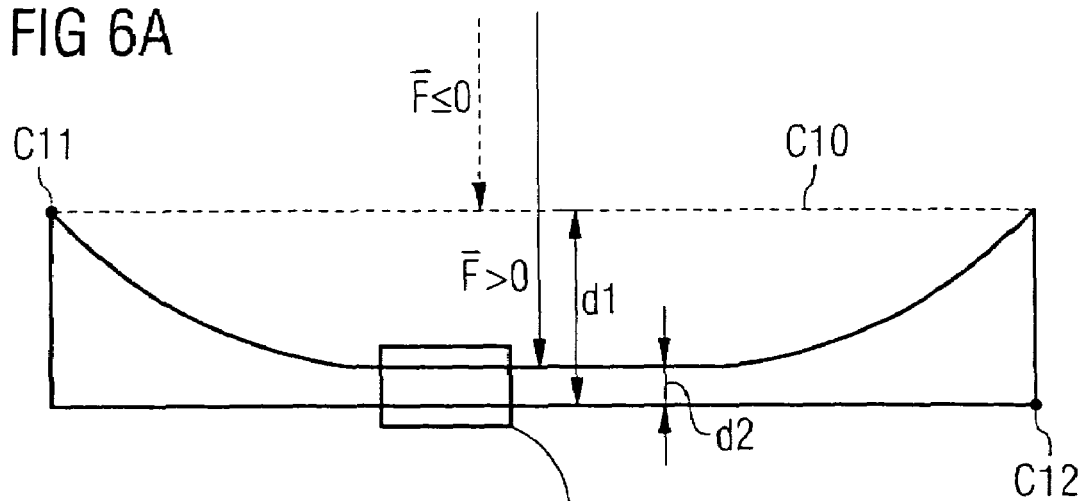
FIG. 6A is a cross section through a schematically represented capacitor of a sensor reflector, one with weight loading (unbroken lines) and one without weight loading (broken lines)

FIG. 6A shows a schematic cross sectional view through a suitable capacitor C10 with a first connection C11, whose reference signal simultaneously describes the first capacitor plate C11, and a second connection C12, whose reference signal simultaneously describes the second capacitor plate C12. If a force $\overline{F} \leq 0$ is applied to a first capacitor plate C11, this capacitor plate C11 represented by a broken line is not moved. Its distance to the second capacitor plate C12 is $d_1$. If however, a force F>0 is applied to a first capacitor plate C11, this approaches a distance $d_2$ at the second capacitor plate C12. FIG. 6A shows an exemplary semiconductor capacitor C or a film capacitor C, wherein the first capacitor plate C11 deflects centrally.

Figure 6B:
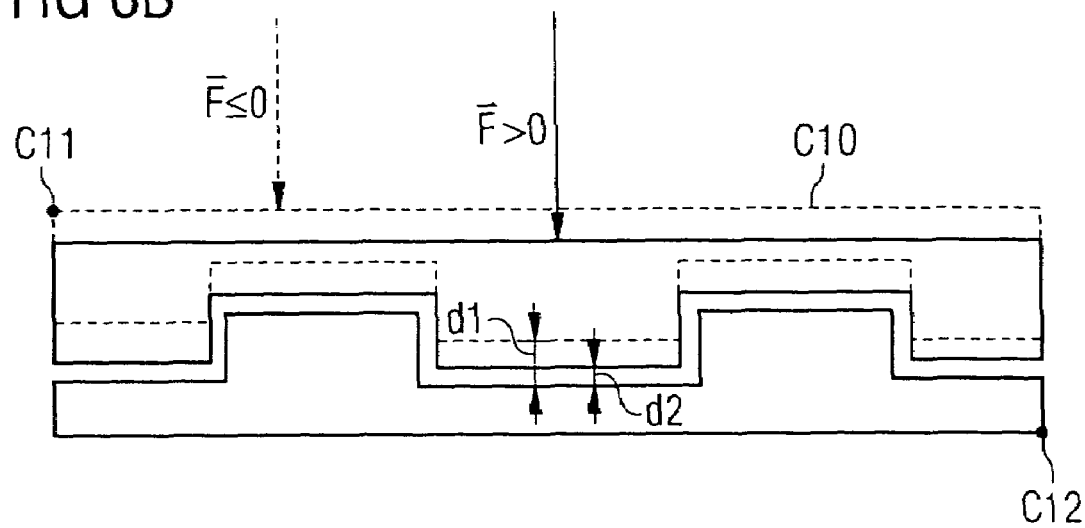
FIG. 6B is a section through a schematic representation of a finger capacitor, similarly one loaded (unbroken lines) and one unloaded (broken lines).

FIG. 6B shows a suitable so-called finger capacitor C10 wherein the first capacitor electrode C11 comprises a finger-shaped structure, which is kept at a distance from a second capacitor electrode C12 with a corresponding complimentary finger structure, wherein the finger structure of the first capacitor electrode C11 can disengage on approaching, without electrically contacting the first capacitor electrode C11. As shown in FIG. 6A, the position of the first capacitor electrode C12 without force effect or with negative force effect is indicated with a broken line, and said capacitor with force effect is indicated with an unbroken line.

Correspondingly, the distances to the lower capacitor plates C12 are described again as larger d1 and as smaller d2. This type of finger capacitor C10 can be manufactured similarly in a semi-conductor structure, wherein FIG. 6B can be understood as an exemplary section of the centrally deflecting capacitor structure of FIG. 6A.

We claim:

1. A device for detecting the position and the weight of a person, comprising:
    at least one transceiver for electromagnetic signals;
    at least one sensor reflector disposed to enable detection of a presence and a position of the person, said sensor reflector having an antenna for reflecting a transmitting signal from said transceiver as a sensor reflector signal;
    a weight-dependent changeable electrical load device associated with said sensor reflector and disposed to detect weight information about the person;
    said antenna of said sensor reflector being linked to said electrical load device and configured to superimpose on the sensor reflector signal of said sensor reflector weight information about the person detected by said load device;
    an evaluation unit connected to said transceiver and being configured to evaluate the weight information of the person; and
    said at least one sensor reflector having an oscillator configured to oscillate at a weight-dependent oscillating frequency, thereby changing the load depending on the weight acting thereon.

2. The device according to claim 1, wherein said sensor reflector is one of a plurality of sensor reflectors each connected to a respective said antenna and said antennas are configured to communicate via the transmitting signal and the reflector signal regardless of whether a direct view to a respective sensor is obstructed by the person.

3. The device according to claim 1, wherein said load device comprises a switch having:
    a first connection linked to said antenna;
    a control connection linked to a signal output of said oscillator; and
    a second connection linked to a reference potential.

4. The device according to claim 1, wherein said oscillator comprises an oscillation frequency-influenced element with a weight-dependent value characteristic for said element.

5. The device according to claim 4, wherein said oscillation frequency-influenced element is a capacitor.

6. The device according to claim 4, wherein said oscillation frequency-influenced element is a coil.

7. The device according to claim 4, wherein said oscillation frequency-influenced element is a quartz oscillator.

8. The device according to claim 1, wherein said at least one sensor reflector is one of a plurality of sensor reflectors strategically disposed in or on a motor vehicle seat.

9. The device according to claim 1, wherein said at least one sensor reflector is one of a plurality of sensor reflectors disposed at a seating surface and/or a backrest and/or at a head support of a motor vehicle seat.

10. A method for detecting a position and a weight of a person, which comprises:
    providing the device according to claim 1;
    transmitting a transmitting signal with said transceiver
    receiving the transmitting signal with said sensor reflector;
    superimposing weight information of a person on the signal with said sensor reflector;
    reflecting the receiving signal provided with the weight information as a sensor reflector signal;
    receiving the sensor reflector signal with said transceiver; and determining the weight information of the person from the sensor reflector signal received by said transceiver.

11. A sensor reflector for detecting a weight of a person, comprising:
    an antenna configured to reflect a high-freguency transmitting signal of a transceiver as a sensor reflector signal;
    an electrical load device connected to said antenna, said load device having a weight-dependent changeable load value;
    an oscillator configured to oscillate at a weight-dependent oscillating freguency, thereby changing the load depending on the weight acting thereon: and
    said antenna being configured to transmit the sensor reflector signal with the output signal of said load device containing weight information about the person superimposed on the reflector signal.

12. A method for detecting a position and a weight of a person, which comprises:
    providing a sensor reflector according to claim 11;
    transmitting a transmitting signal with a transceiver;
    receiving the transmitting signal with said sensor reflector;
    superimposing weight information of a person on the receiving signal with said sensor reflector, and reflecting the signal with the superimposed weight information as a sensor reflector signal;
    receiving the sensor reflector signal with the transceiver; and
    determining the weight information of the person from the sensor reflector signal received by the transceiver.

* * * * *